UNITED STATES PATENT OFFICE.

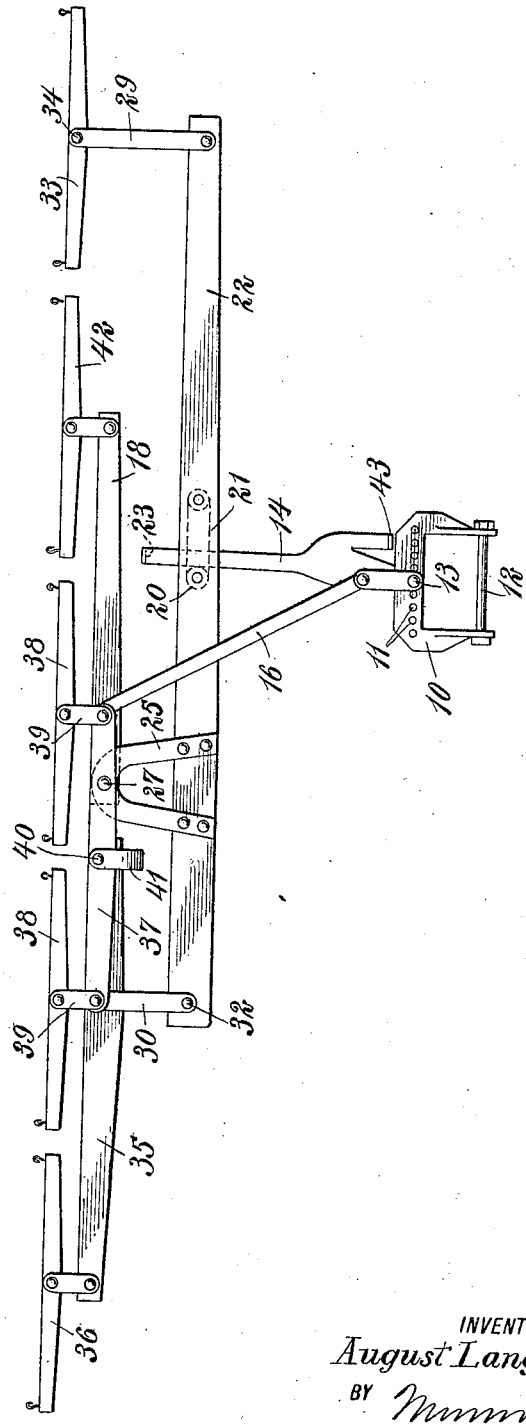

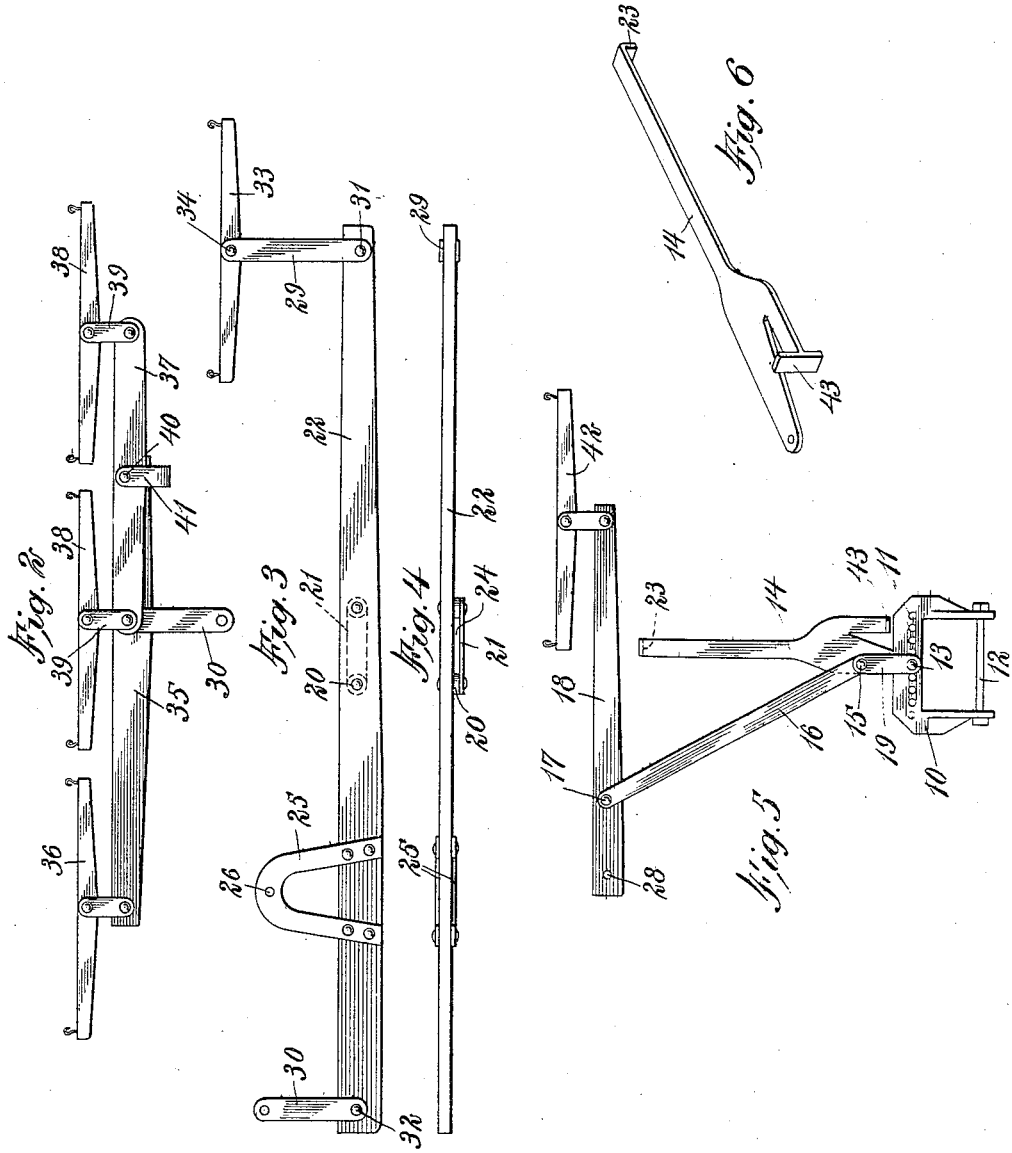

AUGUST LANGE, OF SCRIBNER, NEBRASKA.

DRAFT-EQUALIZER.

1,095,894. Specification of Letters Patent. Patented May 5, 1914.

Application filed August 7, 1913. Serial No. 783,484.

*To all whom it may concern:*

Be it known that I, AUGUST LANGE, a citizen of the United States, and a resident of Scribner, in the county of Dodge and State of Nebraska, have invented a new and Improved Draft-Equalizer, of which the following is a full, clear, and exact description.

Among the principal objects which the present invention has in view are; to provide means for equalizing the pulling strain exerted by a wide-spread team; to provide a spreader or equalizer for distributing a team to advantage, irrespective of the line of draft, whereby advantage may be taken of favorable pulling conditions; and to provide a hitching device whereby unequal pulling strains are equalized.

One embodiment of the present invention is shown in the accompanying drawings, in which—

Figure 1 is a plan view of an equalizer constructed and arranged in accordance with the present invention; Fig. 2 is a detail view, showing in separated relation one of the secondary spreader bars and draft trees connected therewith; Fig. 3 is a detail view, showing in separated relation the main spreader bar; Fig. 4 is an edge view of the main spreader bar shown in Fig. 3; Fig. 5 is a detail view, showing in separated relation the device for immediately connecting the vehicle and equalizer; Fig. 6 is a detail view of a thrust bar to prevent the turning of a vehicle in one direction.

As seen in the drawings, a hitching plate 10 is provided, said plate being furnished with a series of bolt holes 11 arranged as seen in Figs. 1 and 5, whereby the line of draft may be laterally shifted to accommodate the center of resistance or load. The plate 10 is pivotally secured to a vehicle or to a clevis provided thereon, by means of a pivot bolt 12. The ends of the plate and ends of the bolt are widespread to resist any veering exerted by the pull of the team. The hitching plate 10 is pivotally secured by means of a bolt 13 to a thrust bar 14. The thrust bar 14 is pivotally connected by a bolt 15 with a connecting bar 16. The bar 16 is pivotally connected by means of a bolt 17 with a spreader bar 18. It will be noted that a link 19 directly connecting the plate 10 and bar 16 is normally in the line of draft, or perpendicular to the bolt 12, which is usually disposed transverse to the vehicle, or perpendicular to the line of travel or draft, while the bar 16 is oblique to the line of draft, so that the normal tendency of said bar, when drawn upon, is to pull the pivot bolt 15 into line with the bolts 17 and 13. This effort, when transferred to the bar 14, exerts a sidewise thrust on the collar 20 at the end of the loop 21, to move the primary spreader bar 22 to the side of the line of draft toward which the bar 16 is forwardly inclined. The forward end of the bar 14 is provided with a hook 23, which prevents the complete withdrawal of the bar 14 from the guide slot 24 formed between the side of the spreader bar 22 and the loop 21. It will be noted that the loop 21 is relatively short, to permit a limited side movement or thrust of the bar 14 therein.

As hereinafter explained, one of the advantages of the present equalizer is that the major portion of the team may be disposed at one side of the center of the load, or to one side of the hitching plate 10. In drawing agricultural implements for which the present invention is peculiarly designed, this arrangement of the team is found to be advantageous, permitting, as it does, the greater number of the animals to walk on the hard or unbroken land, as when plowing.

The main spreader bar 22 has rigidly secured thereto hitching loops 25, one of said loops being extended from each side of said bar, as seen best in Fig. 4 of the drawings. At the forward end of said loops, they are provided with perforations 26 adapted to receive a bolt 27, which bolt is passed through a perforation 28 at the short end of the bar 18. The bar 22 is equipped at either end with a relatively long swinging bar 29 and a relatively short swinging bar 30, which bars are pivotally connected with the spreader bar 22, by bolts 31 and 32, respectively. The bar 29 is pivotally connected to a swingletree 33 by a bolt 34. To the bar 30 is connected a doubletree 35. To the doubletree 35 are hitched three animals, while to the swingletree 33, one animal only is hitched. To equalize the strain upon said animals, when pulling on the bar 22, the loops 25 are so disposed that the pivot point as represented by the bolt 27, coincides with the first quarter dimension of the length of the bar 22, transforming said bar 22 into a lever, the ends whereof are in the ratio of three to one, permitting the single animal attached to the swingletree 33 to pull equally against the three animals attached to the doubletree 35. The doubletree 35 is pivotally connected at one end with the swingletree 36, and at the other end with a doubletree 37. The swingletrees 38 are each connected by means of links 39, with the doubletree 37 (see Figs. 1 and 2 of the drawings). The connection between the doubletrees 37 and 35 is made by bolts 40 and a loop 41. Thus, it will be seen that the spreader bar 22, when pivoted on the bolt 27 located on said bar, as above described, provides for equalizing the pull or draft of three animals at one end of said bar with the pull of one animal at the opposite end of said bar. The pull of the four animals hitched thus to the spreader bar 22, is transferred to the spreader bar 18. The bar 18, as above described, is pivoted on the bolt 17 and operatively connected with the spreader bar 22 by the bolt 27 and loops 25. The disposition of the bolt 17 on the spreader bar 18 is such that the pull of one animal hitched to the swingletree 42 equals the pull of the four animals hitched to the bar 22. In other words, the disposition of the bolt 17 on the bar 18 is coincident with the first fifth division of said bar 18.

From the foregoing, it is obvious that if either of the animals hitched to the swingletrees 38 fails to keep pace with his mate, the doubletree 37 will swing on the bolt 40, and thereby apprise the driver of the sluggishness of the animal. If the animal hitched to the swingletree 36 fails in his work, the doubletree 35, by swinging on its pivot bolt, will apprise the driver in like manner of the failure on the part of the animal in this position. If the animal hitched to the swingletree 33 slows in his work, the spreader bar 22 will swing on its pivot bolt 27. If the animal hitched to swingletree 42 fails to bear his proportion of the load, the spreader bar 18 will swing on the bolt 17, likewise apprising the driver of the need of attention to that particular animal. In other words, the arrangement herein described and shown is such that if any one of the animals attached to any of the swingletrees fails in maintaining his proportion of load, the fact is immediately made plain to the driver, whose duty it is to keep each and all of the animals doing their just proportion of the work.

The aggregate pull of the animals is primarily imposed on the connecting bar 16, which, as above described, is connected with the hitching plate 10 through the intermediary of the link 19 and thrust bar 14. The disposition of the link 19 and connecting bar 16 is such as to swing the end of the thrust bar 14 resting in the slot 24, against the end of said slot, to move the spreader bar 22 to the left, or in the direction of inclination of the bar 16. When, as sometimes happens, the implement being drawn undertakes to slue around in answer to the pull exerted by the bar 16, the plate 10 strikes upon a shoe 43 vertically mounted on the end of the bar 14, as shown in the drawings. The limit of thrust in the direction toward the line of pull is thus determined.

From the foregoing, taken in conjunction with the drawings, it is obvious that a team may be hitched by means of the equalizer herein described and shown with the greater number of the animals constituting the team, arranged at one side of the path of the vehicle being drawn. It is also obvious that while the thrust bar 14 prevents the vehicle and plate 10 connected therewith from sluing into the line of greatest pull, the team may be swung close in to the left of the vehicle, thereby permitting the same to be turned sharply in this direction. This feature of operation is desirable particularly for agricultural implements, such as plows, harrows and harvesters, where the turn is usually made to the left. It will, however, be understood that by reversing the hitch, a sharp turn may be made to the right.

Claims.

1. A draft equalizer, comprising a plurality of spreader bars pivotally connected in serial order, with multiplied effect; a pivotal connection between the last bar of the series and a vehicle, embodying a connecting bar inclined forwardly away from the line of draft; a thrust bar operatively connected with said connecting bar and one of said spreader bars to maintain the inclined relation of said connecting bar; and means for controlling the lateral movement of said thrust bar.

2. A draft equalizer, comprising a plurality of spreader bars pivotally connected in serial order, with multiplied effect; and a pivotal connection between the last bar of the series and a vehicle, embodying a connecting bar inclined forwardly away from the line of draft; said spreader bars being each provided with a swingletree at one end and a pivot at the opposite end, operatively connected with one of the other spreader bars.

3. A draft equalizer, comprising a plurality of spreader bars pivotally connected in serial order, with multiplied effect; a pivotal connection between the last bar of the series and a vehicle, embodying a connecting bar inclined forwardly away from the line of draft, said spreader bars being each provided with a swingletree at one end and a pivot at the opposite end, operatively connected with one of the other spreader bars; and a plurality of pivot members operatively connecting said bars, the pivots of said members being disposed on each bar at a unit division thereof removed from the pivot connection with the preceding spreader bar.

4. A draft equalizer, comprising a plurality of spreader bars pivotally connected in serial order, with multiplied effect; a pivotal connection between the last bar of the series and a vehicle, embodying a connecting bar inclined forwardly away from the line of draft; a hitching plate extending laterally in parallel relation to said spreader bars and embodying a plurality of pivot holes serially arranged for connection with said connecting bar; a thrust bar operatively connected with said plate and said connecting bar, having a forward extension to engage one of said spreader bars, and provided with a shoe to engage said plate to prevent the lateral swinging of said thrust bar in one direction; and a loop operatively connecting said thrust bar and the spreader bar adjacent thereto to permit a limited free movement of the free end of said thrust bar.

In testimony whereof I have signed my name to this specification in the presence of two subscribing witnesses.

AUGUST LANGE.

Witnesses:
ARTHUR K. DAME,
JOHN F. ROHN.

Copies of this patent may be obtained for five cents each, by addressing the "Commissioner of Patents, Washington, D. C."